United States Patent [19]

Takahashi

[11] Patent Number: 4,603,893
[45] Date of Patent: Aug. 5, 1986

[54] PIPE COUPLING JOINT

[75] Inventor: Saburo Takahashi, Kobe, Japan

[73] Assignee: Mitsubishi Jukogyo Kabushiki Kaisha, Tokyo, Japan

[21] Appl. No.: 685,467

[22] Filed: Dec. 24, 1984

[51] Int. Cl.⁴ .............................................. F16L 17/02
[52] U.S. Cl. .................................... 285/342; 285/369; 285/910
[58] Field of Search ....... 285/342, 343, 369, DIG. 11, 285/337; 277/209, 211

[56] References Cited

U.S. PATENT DOCUMENTS

| | | | |
|---|---|---|---|
| 1,601,559 | 9/1926 | Clark | 285/369 X |
| 2,021,745 | 11/1935 | Pfefferle et al. | 285/369 X |
| 2,786,697 | 3/1957 | Rescheneder | 277/209 X |
| 3,135,520 | 6/1964 | Borah | 285/342 X |
| 3,865,410 | 2/1975 | Chen | 285/369 X |
| 4,030,741 | 6/1977 | Fidrych | 285/342 X |
| 4,293,138 | 10/1981 | Swantee | 285/DIG. 11 |
| 4,294,475 | 10/1981 | Kanai et al. | 285/369 X |

FOREIGN PATENT DOCUMENTS 1185766  3/1970  United Kingdom ................ 285/337

Primary Examiner—Dave W. Arola
Attorney, Agent, or Firm—Wenderoth, Lind & Ponack

[57] ABSTRACT

A pipe coupling joint including a pair of rubber packings, with one each being installed onto the outer circumferential surface of one of two pipe segments at the area near the leading end thereof set in alignment and closely opposed relationship with each other, a middle ring of cylindrical shape disposed closely in the middle position between the pair of rubber packings, and a pair of clamp rings. The two pipe segments are joined with each other by having the pair of rubber packings secured and urged in an operative position of engagement between the clamping face of the middle ring and the pair of clamp rings, wherein each of the rubber packings is defined with the top corner at the outer circumference thereof cut away at an oblique angle with respect to its mating surface with the middle ring, and wherein there is formed a step formation which rises at a substantial angle with respect to the inclined clamping face of the middle ring.

6 Claims, 5 Drawing Figures

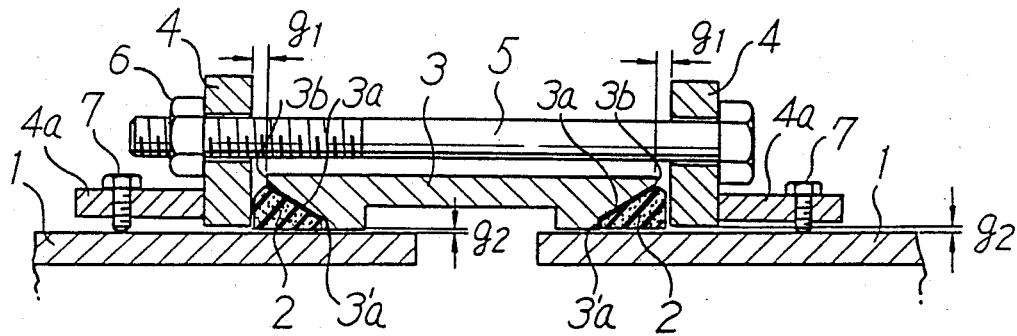
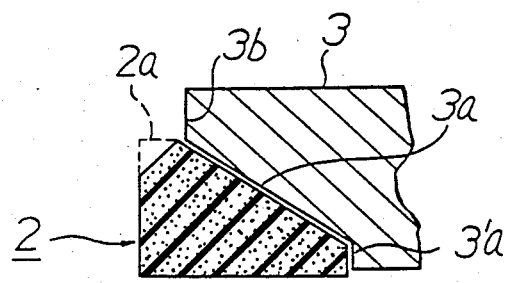
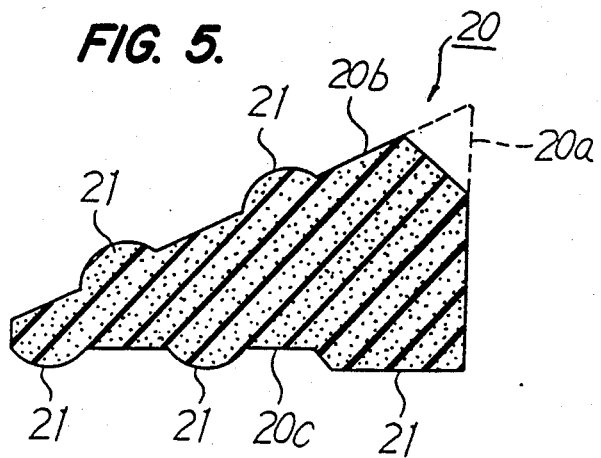

PIPE COUPLING JOINT

BACKGROUND OF THE INVENTION

1. Field of the Invention

The present invention relates generally to a coupling joint for use with a variety of pipes such as steel pipes for the industrial use, and more particularly to an improvement of a coupling joint, which comprises a middle ring and a pair of clamp rings with an efficient clamping and sealing effect, which provides a joint with such an assured performance of fluid-tightness that it may well be adapted for use in a high pressure piping installation such as penstocks for a hydraulic power plant or the like.

2. Description of the Prior Art

The typical construction of a pipe joint as shown in FIG. 1 which is generally known in the art of pipe couplings for the industrial piping installation is such that there are provided a pair of annular rubber packings (b), one each installed onto the leading end of each of pipes set in alignment and closely opposed relationship with each other, a middle ring (c) of cylindrical shape mounted to rest in the middle position between the pair of rubber packings (b), and a pair of annular clamping rings (d), one each disposed adjacent the exterior or opposite end face of one of the paired rubber packing (b) to the side where the middle ring (c) rest in position, and that the coupling joint is secured to provide the effect of sealing at the adjacent pipe ends by tightening a plurality of bolts (e) and nuts (f) so as to draw the paired clamp rings (d), toward each other, so that the pair of rubber packings are caused to be squeezed in urging relationship against the sealing surfaces ($c_1$) of the middle ring (c), which are formed in an inclined fashion at an oblique angle, and against the pair of clamp rings (d), accordingly.

With such a typical construction of the pipe coupling joint for the use as mentioned above, however, it can commonly not be relieved of such drawbacks in practice, as are described below.

Referring more specifically to FIG. 2, it is known that a rubber packing (b) has generally an outer circumferential portion having a cross-sectional shape which is deformed, when it is tightened between the sealing surfaces ($c_1$) of the middle ring (c) and the clamping side face of the clamp ring (d), thus resulting in a possible expansion or bulging of the outer circumferential portion of the rubber packing (b) out of the circumferential gap existing between the vertical face ($c_2$) of the middle ring (c) and the clamping face of the clamp ring (d). Such bulged portion ($b_1$) would very possibly kill or spoil the intended effect of clamping with these clamping members, and would then bring a possibly irregular distribution of clamping effect from such improper struggling conditions into existance around the circumferential portion of the rubber packing (b). Under such undesired conditions in the settings of the coupling joint, there would naturally be brought about a lack of reliability in the seals between the middle ring (c) and the rubber packing (b), and between the rubber packing (b) and the steel pipe (a) when the coupling joint is set in position and clamped, which would eventually result in the limit in the practice of such pipe joints only to the application where the design pressure level of the fluid flowing in the inside of the steel pipe (a) is 10 kg/cm² or less, and there is no chance in practice for these pipe joints to be used in a higher fluid pressure level application.

Furthermore, as it is impossible in practice to have the inner diameters of the middle ring (c) and the clamp ring (d) strickly coincide with the outer diameter of the steel pipe (a) in the manufacture thereof, it is inevitable that there exist a substantial gap between these elements when installed together, and as a consequence, it is therefore impossible in practice to prevent the tendency of the gap as formed between these elements at the upper or higher points of the steel pipe (a) from growing to be greater than that at the under or lower points of the steel pipe (a), since the middle ring (c) and clamp ring (d) would fall to contact immediately upon the outer circumference of the steel pipe (a) because of the weights of these elements when installed in position, thus naturally making it difficult to have an even distribution of sealing effect all around the circumference, particularly on the lower side of the steel pipe (a).

The present invention is essentially directed to the provision of a proper resolution to such inconveniences and difficulties in practice as outlined above and experienced in the use of the conventional pipe coupling joints which have not been attended with any proper countermeasures therefor, for affording an extensive use with the general piping installation inclusive of a high pressure application.

SUMMARY OF THE INVENTION

It is therefore a primary object of the present invention to provide an improved pipe coupling joint for use in a piping installation wherein any factors hampering a proper clamping and sealing effect from a possible deformation in the rubber packings employed therein can be dissolved effectively by virtue of the provision of a cut portion in the outer circumference of a rubber packing, and wherein there are attained a due clamping and sealing performance and high reliability in the attainment of seals provided between the middle ring and the rubber packing, and between the rubber packing and the steel pipe by virtue of the provision of a step formation in the clamping work surface of the middle ring.

It is another object of the present invention to provide an improved pipe coupling joint for use in a piping installation wherein any factors hampering a proper clamping effort from a possible deformation in the rubber packings employed therein can be dissolved effectively by virtue of the provision of a cut portion in the outer circumference of a rubber packing, and wherein there are attained a due clamping and sealing performance and high reliability in the attainment of seals provided between the middle ring and the rubber packing, and between the rubber packing and the steel pipe by virtue of the further provision of projecting ridges in both working surfaces of the rubber packing facing the middle ring and the steel pipe, respectively.

The principle, nature and details of the present invention will, as well as advantages thereof, become more apparent from the following detailed description by way of preferred embodiments of the invention, when read in conjunction with the accompanying drawings.

BRIEF DESCRIPTION OF THE DRAWING

In the drawings:

FIG. 3 is a longitudinal cross-sectional view showing the upper part alone of the pipe coupling joint by way of a first preferred embodiment of the invention;

FIG. 4 is a transverse cross-sectional view showing the state of mating of the rubber packing shown in FIG. 3 with the middle ring 3; and FIG. 5 is a transverse cross-sectional view showing the general configuration of the rubber packing according to a second preferred embodiment of the invention.

DETAILED DESCRIPTION OF THE PREFERRED EMBODIMENTS

Figure 1:
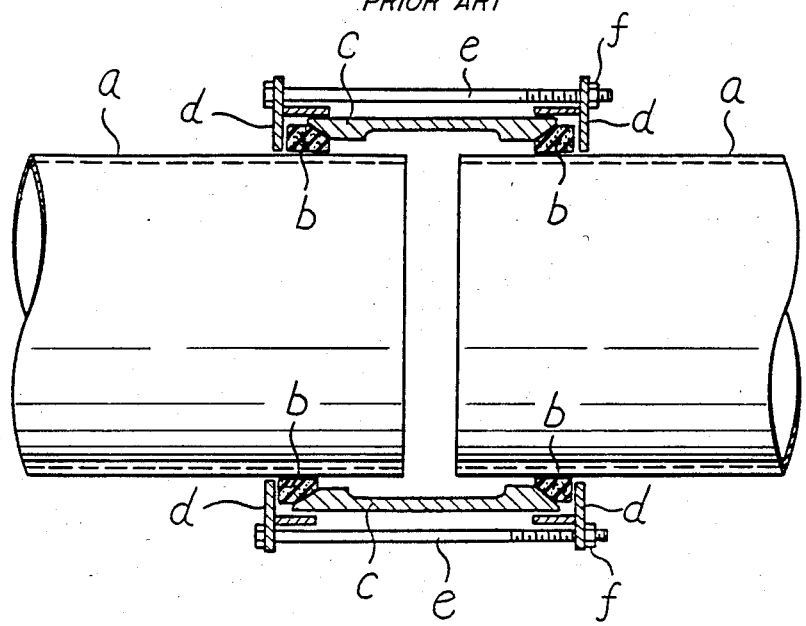
FIG. 1 is a schematic view showing, in longitudinal cross-section, a typical construction of the conventional pipe coupling joint.

The present invention will now be described in detail by way of example on preferred embodiments thereof in conjunction with the accompanying drawings, as follows.

Now, referring to FIG. 3, there is shown, by way of a first preferred embodiment of the present invention, an improved pipe coupling joint for use in a piping installation, wherein there are provided two pipe segments to be jointed together and designated by the reference numeral 1, which are placed in right alignment and closely opposed relationship with each other, a pair of rubber packings of annular shape designated by reference numeral 2, with one each installed onto the outer circumferential surface of one of the pipes 1, at the area near the leading end thereof set in the aligned and opposed position with the other, a middle ring 3 of cylindrical shape disposed closely in the middle position between the pair of rubber packings 2, a pair of clamp rings 4 of annular or toroidal shape disposed in a closely opposed relationship with the exterior or opposite faces of the rubber packings 2, to the side where the middle ring 3 is mounted to rest in position, and a plurality of bolts 5 and nuts 6, which are adapted to draw the clamp rings 4, toward each other so as to be urged against the rubber packings 2, these bolts 5 and nuts 6 being provided in corresponding pairs in such a manner that they are disposed at an appropriate distance from each other in the circumference of the clamp rings 4. It is preferred that these middle ring and clamp rings are made of high tension steel or an equivalent material.

Referring more specifically to FIG. 4, there is shown the detail of the first embodiment of the invention such that the rubber packing 2 is formed with a portion $2a$ cut away at the upper right corner thereof as viewed in this drawing figure, which is specifically designed to provide the advantageous effect of relieving that portion of rubber packing 2 from a possible deformation which may be produced when the rubber packing 2 is tightened to be squeezed between the clamping surface $3a$ of the middle ring 3 and the contact face of the clamp ring 4, as the upper right corner of the rubber packing 2 is cut away and there is left no substance to be protruded owing to bulging of this particular corner portion out of the gap between the vertical end face $3b$ of the middle ring 3 and the contact face of the clamp ring 4, as encountered in the installation work noted above.

Further to the cut portion $2a$ of the rubber packing 2 stated above, it is preferred that this particular portion is cut off at an oblique angle as typically shown in FIG. 4 so that it may exhibit the advantageous effect of preventing from ocurring or eliminating a possibility of protrusion or bulging of the questioned corner portion of the rubber packing 2 when so squeezed by tightening the bolts 5 during installation of the pipe coupling joint.

As also seen in FIG. 4, the clamping surface $3a$ of the middle ring 3 is provided with a step formation $3'a$ in the form of a small area of face standing in the vertical way with respect to the side thereof facing the steel pipe 1. In connection with the provision of such a step formation on the part of the middle ring 3, there is of course provided a correspondingly similar step formation on the opposing part of the rubber packing 2 so that it may dwell in snug engagement or cooperation with the step formation on the middle ring 3. With the provision of this step formation in the clamping surface $3a$ together with the corresponding step formation in the rubber packing 2, there will further be attained an increased clamping and sealing effect in the close and positive engagement with the rubber packing 2, and in addition, an efficient effect of urging the rubber packing 2 against the outer circumferential surface of the steel pipe 1, whereby this is to assure the improved performances of clamping and sealing in the engagement between these relative members of the pipe coupling joint.

In addition, according to the present preferred embodiment of the invention, there may be provided further a pair of ribs $4a$, of annular shape extending in the horizontal direction all along the outer circumferences of and in the axial direction of the steel pipes 1, one rib being fixed to the exterior face of each clamp ring 4 and extending outwardly at right angles therefrom, each of these horizontal ribs $4a$, having a plurality of setting bolts 7 extending in threaded engagement therethrough and located at uniform intervals in the circumferential direction thereof. With such an arrangement, it is seen that the circumferential gap $g_2$ formed between the outer circumferences of the steel pipes 1, and the inner circumferences of the clamp rings 4, can now be adjusted to be even all around the steel pipes 1 by screwing these bolts 7 toward or away from the outer circumferential surfaces of the steel pipes 1, as the case may be.

Now, according to such a construction of the pipe coupling joint by way of the first preferred embodiment of the present invention as shown in FIGS. 3 and 4, when installing the clamp rings 4, the rubber packings 2, and the middle ring 3 in position around the outer circumference of the steel pipes 1, at the areas near the leading ends thereof as shown, the securing bolts 5 are firstly inserted across the openings provided in the clamp rings 4, mounted in the oppposedly spaced relationship with each other, then the nuts 6 are engaged threadedly with these bolts 5, and thereafter the clamp rings 4, can now be drawn toward each other by tightening the bolts 5. As the plurality of the securing bolts 5 are located all around the circumference of the clamp ring 4 at an appropriate uniform interval, there may assuredly be effected an even distribution of clamping force upon the whole circumferences of the rubber packings 2, when tightened with an even force.

Figure 2:
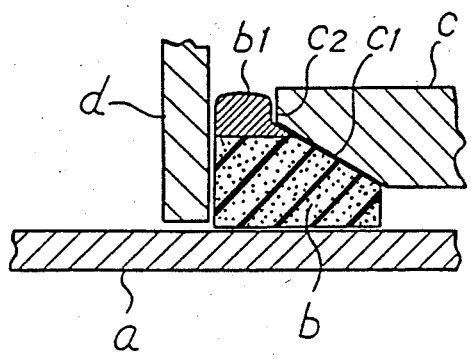
FIG. 2 is an enlarged fragmentary view showing, in longitudinal cross-section, the state of a rubber packing in FIG. 1, when clamped together with relative members set in the installed position.

In operation, as the securing bolts 5 are tightened, the above mentioned rubber packings 2, are forced to be deformed under the squeezing force as produced from the engagement between the clamping surface $3a$ of the middle ring 3 having the step formation therein and in the contact face of the clamp ring 4. By virtue of the provision of the cut portion $2a$ in the outer circumferential corner of the rubber packing 2 according to the present invention, it is seen that there is left no protrusion or bulging $b_1$ of the rubber packing 2 in the gap $g_1$ as formed between the vertical rising portion $3b$ of the middle ring 3 and the contact face of the clamp ring 4, in contrast to the conventional configuration as typically shown in FIG. 2, thereby dissolving effectively any undesired factors hampering the desired effect of clamping in the pipe coupling joint, and therefore, resulting in an even distribution of clamping force all around the circumference of the rubber packing 2.

In addition, by virtue of the provision of the step formation by the vertically rising face 3'a in the lower part of the clampling surface 3a of the middle ring 3 facing the steel pipe 1 and the corresponding step formation on the part of the rubber packing 2, the former being in positive cooperating engagement with the latter, there are attained an additional effect of preventing or eliminating the possible protrusion or bulging of the rubber packing 2 into the gap $g_2$ as stated above from occurring, as well as an efficient effect of clamping and sealing in the engagement between the above noted clamping surface 3a of the middle ring 3 and the rubber packing 2, and also between the rubber packing 2 and the outer circumference of the steel pipe 1, which will present an excellent sealing performance in the practice of this pipe coupling joint construction to such an extent that it may well be adapted to an application in which fluid of a relatively high pressure exists in the inside of the pipe 1.

Furthermore, with such advantageous features in the construction of the pipe coupling joint according to the present invention which can afford the excellent clamping and sealing performances as stated fully hereinbefore, there is attained an increased effect of minimizing or eliminating the possibility that there would grow a greater gap between the relevant sealing elements particularly at the lower points of the piping installation than the other higher points thereof owing to the weights of the middle ring 3, the clamp rings 4, and the like in the installed position under the effect of gravity. This advantageous effect turns out to be so effective and successful that there would be no or less need for making use of the securing bolts 7, for the attainment of the objects of the present invention, which would nonetheless be kept as yet another significant feature particular to the present invention.

Referring further to the benefit in assistance of the security of clamping and sealing effects as brought from the use of these securing bolts 7, by screwing these bolts toward or away from the outer circumference of the steel pipe 1, particularly at the higher points thereof, as necessary, for a fine adjustment of any difference or deviation in the gaps as encountered throughout the entire circumference of the steel pipe 1 during installation, such a deviation in the questioned gap can efficiently be removed, thus resulting in an efficient dissolution of the possibility of a deviation in the distribution of the gaps $g_2$ all around the circumference thereof, which would undoubtedly assist accomplishing the eventual effect of clamping and sealing of the pipe coupling joint uniformily according to the present invention as noted above.

Now, referring to the second embodiment of the present invention which is shown typically in FIG. 5, in comparison with the first embodiment thereof shown in FIGS. 3 and 4, it is seen that there is formed a top corner portion 20a of the rubber packing 20 cut at an oblique angle which is similar to the cut portion 2a of the rubber packing 2 according to the first embodiment, and further there are formed a plurality of projections or ridges 21 extending in a concentrically spaced relationship with each other with respect to the axis of the steel pipe 1 in the inclined working surface 20b of the rubber packing 20 which faces the middle ring 3 and in the bottom surface 20c thereof which faces the outer circumference of the steel pipe 1 when installed in position, respectively, instead of the provision of the step formation which is adapted to mate in cooperation with the corresponding formation provided on mating part of the clamping surface 3a of the middle ring 3.

With such a construction of the rubber packing 20, while the other organizational elements such as the middle ring 3, the clamp rings 4, the securing bolts 5 and the nuts 6 are identically incorporated with the organization of the pipe coupling joint according to the first embodiment of the invention, there is attained an additional effect of clamping and sealing at the individual local points where such concentrically spaced projections or ridges 21 rest, by virtue of the function as provided from these ridges 21 formed in the inclined working surface 20b and in the bottom surface 20c of the rubber packing 20, respectively, thus promoting substantially the effect of clamping and sealing in the operative engagement between the clamping surface 3a of the middle ring 3 and the rubber packing 20, and between the rubber packing 20 and the steel pipe 1, which would substantially assist accomplishing the same effect and functions as attained from the first embodiment of the invention.

Needless to mention, it is possible in the practice of the second embodiment of the present invention to furnish the step formation in the clamping surface of the middle ring 3 or the provision of the securing bolts 7, if necessary, in addition to the specific features which is particular to the present invention as noted above.

The pipe coupling joint according to the present invention may of course be adapted for use with such a variety of pipes as plastic resin pipes, or pipes of any sections, and further, it can safely be employed in the sealing applications for liquids and gases under relatively high pressures.

It is now clear that the objects as set forth hereinbefore among those made apparent from the preceding description are efficiently attained, and while the present invention has been explained by way of the preferred embodiments thereof, it is to be understood that many changes and modifications may be made in the foregoing teaching without departing from the spirit and scope of the invention, and it is intended that all matter contained in the foregoing description or shown in the accompanying drawings shall be interpreted as illustrative and not in a limiting sense.

It is also to be understood that the appended claims are intended to cover all of such generic and specific features particular to the invention as disclosed herein and all statements relating to the scope of the invention, which as a matter of language might be said to fall thereunder.

What is claimed is:

1. A pipe coupling for joining first and second pipes end-to-end, comprising:
   a cylindrical middle ring having a longitudinal axis and having first and second mating middle ring surfaces at respective opposite first and second longitudinal ends of said middle ring, said first and second mating middle ring surfaces respectively including
   first and second conical clamping faces facing toward said axis and extending in opposite axial directions at respective first and second acute angles with respect to said axis, first and second annular step surface portions respectively radially inward of said first and second conical clamping faces, extending radially outward at respective angles to said axis which are respectively substantially greater than said first and second acute angles, so as to respectively intersect said first and second conical clamping faces, and first and second axially spaced apart elastic annular packings respectively disposed at said opposite ends and facing said first and second mating middle ring surfaces, each having an annular inclined mating surface inclined so as to mate with a respective one of said first and second clamping faces, and each having a radially inner surface for facing the outer surfaces of the first and second pipes; and means for urging said first and second packings toward each other while respectively on the first and second pipes to be joined, with said center ring therebetween surrounding the first and second pipes, so as to seal said first and second packing on the first and second pipes, said means including first and second axially spaced apart cylindrical clamping rings disposed so that said first and second packings and said middle ring are disposed therebetween;

said first and second packings respectively opposing said first and second clamping rings, each of said first and second packings further including an annular radially outer surface extending from a radially outer edge of said annular inclined mating surface radially inwardly and axially toward the one of said first and second clamping rings opposed thereto, a clamping ring engaging surface extending radially inwardly from an end of said annular radially outer surface opposite said radially outer edge, and an annular packing step surface angled to mate with a respective one of said first and second annular step surface portions of said middle ring;

said first and second clamping rings being movable axially toward each other so as to engage the respective clamping ring engaging surfaces of said first and second packings with respective spaces between said first and second clamping rings and the mating ring surfaces opposed thereto, said spaces being directly above and exposed to the radially outer surfaces of said first and second packings.

2. A coupling as in claim 1, wherein said first and second mating middle ring surfaces respectively include first and second end faces located radially outward of said first and second clamping faces and extending radially outwardly from said first and second clamping faces so as to oppose said first and second clamping rings radially outward of said clamping ring surfaces, with said respective spaces therebetween.

3. A pipe coupling as in claim 1, wherein said first and second clamping faces have radially outermost edges, said first and second packings being entirely radially inward of said radially outermost edges.

4. A pipe coupling for joining first and second pipes end-to-end, comprising:

a cylindrical middle ring having a longitudinal axis and having first and second mating middle ring surfaces at respective opposite first and second longitudinal ends of said middle ring, said first and second mating middle ring surfaces respectively including first and second conical clamping faces facing toward said axis and extending in opposite axial directions at respective first and second acute angles with respect to said axis;

first and second axially spaced apart elastic annular packings respectively disposed at said opposite ends and facing said first and second mating middle ring surfaces, each having a bottom face for facing the outer surfaces of the first and second pipes and an annular inclined mating surface inclined so as to mate with a respective one of said first and second clamping faces; and means for urging said first and second packings toward each other while respectively on the first and second pipes to be joined, with said center ring therebetween surrounding the first and second pipes, so as to seal said first and second packing on the first and second pipes, said means including first and second axially spaced apart cylindrical clamping rings disposed so that said first and second packings and said cylindrical ring are disposed therebetween;

said first and second packings respectively opposing said first and second clamping rings, each of said first and second packings further including an annular radially outer surface extending from a radially outer edge of said annular inclined mating surface radially inwardly and axially toward the one of said first and second clamping rings opposed thereto, a clamping ring engaging surface extending radially inwardly from an end of said annular radially outer surface opposite said radially outer edge, and annular ridges on said annular inclined mating surface for sealingly engaging the first and second clamping faces and on the bottom face for sealingly engaging the outer surfaces of the first and second pipes;

said first and second clamping rings being movable axially toward each other so as to engage the respective clamping ring engaging surfaces of said first and second packings with respective spaces between said first and second clamping rings and the mating ring surfaces opposed thereto, said spaces being directly above and exposed to the radially outer surfaces of said first and second packings.

5. A coupling as in claim 4, wherein said first and second mating middle ring surfaces respectively include first and second end faces located radially outward of said first and second clamping faces and extending radially outwardly from said first and second clamping faces so as to oppose said first and second clamping rings radially outward of said clamping ring surfaces, with said respective spaces therebetween.

6. A pipe coupling as in claim 4, wherein said first and second clamping faces have radially outermost edges, said first and second packings being entirely radially inward of said radially outermost edges.

* * * * *